US009338428B2

(12) United States Patent
Newton et al.

(10) Patent No.: US 9,338,428 B2
(45) Date of Patent: May 10, 2016

(54) 3D MODE SELECTION MECHANISM FOR VIDEO PLAYBACK

(71) Applicant: KONINKLIJKE PHILIPS N.V., Eindhoven (NL)

(72) Inventors: Philip Steven Newton, Eindhoven (NL); Hendrik Frank Moll, Eindhoven (NL); Gheorghe Sorin Stan, Eindhoven (NL); Francesco Scalori, Capolago (CH)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 14/813,174

(22) Filed: Jul. 30, 2015

(65) Prior Publication Data
US 2015/0334383 A1 Nov. 19, 2015

Related U.S. Application Data

(63) Continuation of application No. 14/189,077, filed on Feb. 25, 2014, now Pat. No. 9,219,904, which is a continuation of application No. 12/746,951, filed as application No. PCT/IB2008/055185 on Dec. 10, 2008, now Pat. No. 8,660,402.

(30) Foreign Application Priority Data

Dec. 14, 2007 (EP) .................................... 07123190

(51) Int. Cl.
H04N 13/04 (2006.01)
H04N 13/00 (2006.01)
G11B 20/10 (2006.01)

(52) U.S. Cl.
CPC ...... *H04N 13/0029* (2013.01); *G11B 20/10527* (2013.01); *H04N 13/0033* (2013.01);
(Continued)

(58) Field of Classification Search
CPC ............ H04N 13/0003; H04N 13/002; H04N 13/0055; H04N 13/02399; H04N 5/85
See application file for complete search history.

(56) References Cited

U.S. PATENT DOCUMENTS 5,477,222 A 12/1995 Kahlman et al.
5,920,272 A 7/1999 SchouhamerImmink
(Continued)

FOREIGN PATENT DOCUMENTS

EP 0888018 A1 12/1998
JP 11191895 A 7/1999
(Continued)

OTHER PUBLICATIONS

"Blu-Ray Disc Format General", White Paper, Aug. 2004, pp. 1-37.
(Continued)

*Primary Examiner* — Huy T Nguyen

(57) ABSTRACT

The invention relates to a signal comprising video information and associated playback information, the video information and associated playback information being organized according to a playback format, the video information comprising a primary video stream for two-dimensional (2D) display, and an additional information stream for enabling three-dimensional (3D) display, wherein that the associated playback information comprises display information indicating the types of display possible. The invention also relates to a method and device for playback of such a signal, the method comprising receiving the video information and the associated playback information, processing the display information to determine that both two-dimensional (2D) display possible and three-dimensional (3D) display are possible for the received video information; determining a playback setting of a playback device indicating whether the video information should be displayed two-dimensional (2D) or three dimensional (3D); and processing for display either the primary video stream or the primary video stream and the additional information stream, in accordance with the playback setting of the playback device.

10 Claims, 5 Drawing Sheets

(52) U.S. Cl.
CPC ....... *H04N13/0055* (2013.01); *H04N 13/0454* (2013.01); *H04N 13/0468* (2013.01); *G11B 2020/10611* (2013.01); *H04N 2213/002* (2013.01); *H04N 2213/003* (2013.01); *H04N 2213/007* (2013.01)

(56) References Cited

U.S. PATENT DOCUMENTS

| | | | |
|---|---|---|---|
| 6,069,650 | A | 5/2000 | Battersby |
| 6,111,979 | A | 8/2000 | Katto |
| 6,944,328 | B2 | 9/2005 | Yoshida |
| 8,660,402 | B2 | 2/2014 | Newton et al. |
| 2003/0053797 | A1 | 3/2003 | Oshima et al. |
| 2004/0027267 | A1 | 2/2004 | Rousso |
| 2004/0057612 | A1 | 3/2004 | Tabata |
| 2004/0228606 | A1 | 11/2004 | Kang |
| 2005/0259147 | A1 | 11/2005 | Nam et al. |
| 2007/0047919 | A1 | 3/2007 | Yoshida et al. |
| 2008/0101767 | A1 | 5/2008 | Oshima et al. |
| 2011/0279642 | A1 | 11/2011 | Oshima et al. |

FOREIGN PATENT DOCUMENTS

| | | | |
|---|---|---|---|
| JP | 2004328566 | A | 11/2004 |
| JP | 2006114213 | A | 4/2006 |
| WO | 9816014 | A1 | 4/1998 |
| WO | 0213141 | A1 | 2/2002 |
| WO | 2004034398 | A1 | 4/2004 |
| WO | 2005079078 | A1 | 8/2005 |

OTHER PUBLICATIONS

"Blu-Ray Disc 1.C Physical Format Specifications for BD-ROM", White Paper, 4th Edition, Nov. 2005, pp. 1-26.
"Enhanced Display Data Channel Standard", VESA (Video Electronics Standards Association), Version 1, Sep. 2, 1999, 21 Page Document.
"Display Port Standard", VESA (Video Electronics Standards Association), Version 1, Revision 1A, Jan. 11, 2008, 238 Page Document.
ISO/IEC International Standard 23002-3, First Edition, Oct. 15, 2007, 34 Pages.
High-Definition Multimedia Interface Specification 1.3A, Hitachi, Ltd. Matsushita Electric Industrial Co. Ltd, Philips Consumer Electronics International B.V., Silicon Image, Inc. Sony Corporation, Thomson Inc., Toshiba Corporation, Nov. 10, 2006, 34 Page Document.
CEA (Consumer Electronics Association) Standard, "A DTV Profile for Uncompressed High Speed Digital Interfaces", Mar. 2008, 160 Page Document.
ISO/IEC International Standard, "Information Technology-Generic Coding of Moving Pictures and Associated Audio Information", ISO/IEC 13818-6, First Edition, Sep. 1, 1998, 35 Page Document.
ECMA Standard—No. 130: Data Interchange on Read-Only 120 mm Optical Data Disks (CD_ROM); Jun. 1996, 57 Page Document.
ECMA Standard—No. 267: "12 mm DVD-Read-Only Disk", 3rd Edition, Apr. 2001, 96 Page Document.
Schreer et al, "3D Video Communication: Algorithms, Concepts and Real-Time Systems in Human Centered Communication", John Wiley & Sons, Ltd, 2005, p. 29-34.
Bolio, "Integration of 3D Video Into the Blu-Ray Format", Philps Applied Technologies, Technische Universiteit Eindhoven, Oct. 2007, p. i-ix and 1-108.

+

=

3D MODE SELECTION MECHANISM FOR VIDEO PLAYBACK

This application claims the benefit or priority of and describes the relationships between the following applications: wherein this application is a continuation of U.S. patent application Ser. No. 14/189,077, filed Feb. 25, 2014, which is a continuation of U.S. patent application Ser. No. 12/746,951, filed Aug. 18, 2010, (now U.S. Pat. No. 8,660,402 issued Feb. 25, 2014) which is the National Stage of International Application No. PCT/IB2008/055185, filed Dec. 10, 2008, which claims the priority of foreign application EPO 07123190 filed Dec. 14, 2007, all of which are incorporated herein in whole by reference.

FIELD OF THE INVENTION

The present invention relates to a method of playback of video information suitable for both two-dimensional (2D) display and three-dimensional (3D) display. This invention also relates to a playback device for playback of video information suitable for both two-dimensional (2D) display and three-dimensional (3D) display. This invention also relates to a signal comprising video information and associated playback information and a record carrier comprising recorded thereon a signal.

BACKGROUND OF THE INVENTION

With the introduction of new 3D displays, there is an opportunity for 3D video to break through to the mass consumer market. Such 3D displays are able to handle both 3D display and 2D display. Various formats for 3D video exists today and most are based on single viewpoint stereo, whereby the user can see a scene in stereo from a single viewpoint. However, introducing 3D video does not only relate to introducing new displays capable of 3D display, but it also has impact on the whole content production and delivery chain. Firstly, the production of 3D video content is at an embryonic technology stage and various formats are proposed to be used each with their own advantages and disadvantages. With respect to content distribution, new coding methods were introduced for coding 3D content and new formats were proposed to include the 3D video stream in MPEG streams.

A known fact is that introduction of new formats is usually slow and a desired feature when introducing new format is backwards playback compatibility with the installed player base. A missing area has been the carriage of 3D video content in a content distribution or publishing format such as Digital Video Broadcasting (DVB) or DVD and high definition format such as Blu-ray Disc (BD) or HD-DVD while maintaining backwards compatibility with the installed player base. Moreover, 3D displays are only able to create a high quality 3D feeling in a few spatial regions, compared to the standard 2D image that can be view from all angular direction. Hence, depending either on the viewing conditions or on the number of users viewing the display simultaneously or on user preference, it may be desirable to be able to easily switch 2D and 3D content.

SUMMARY OF THE INVENTION

It is an object of the invention to provide a method of playback of video information suitable for both 2D and 3D display, wherein it is easy to switch between 2D and 3D content, while maintaining the backwards compatibility with 2D legacy devices. In the method according to the invention, the video information and associated playback information are organized according to a playback format, the video information comprises a primary video stream for two-dimensional (2D) display and an additional information stream for enabling three-dimensional (3D) display, the associated playback information comprises display information indicating the types of video streams present; the method comprises receiving the video information and the associated playback information, processing the display information to determine that both two-dimensional (2D) display possible and three-dimensional (3D) display are possible for the received video information; determining a playback setting of a playback device indicating whether the video information should be displayed two-dimensional (2D) or three dimensional (3D); processing for display either the primary video stream or the primary video stream and the additional information stream, in accordance with the playback setting of the playback device. When the video information comprises a primary video stream for two-dimensional (2D) display and an additional information stream for enabling three-dimensional (3D) display, the additional information stream is ignored by legacy devices, hence the backward compatibility is maintained. By processing either the primary video stream for 2D display or both the primary video stream and the auxiliary stream for 3D display in dependence on a detected playback setting of a playback device indicating whether the video information should be displayed two-dimensional (2D) or three dimensional (3D), the switch between 2D and 3D content can be easily performed by controlling the playback setting of the playback device.

When transitioning from 2D to 3D and vice-versa the playback device and the video processing unit is re-configured to change from one presentation mode to the other. During this re-configuration process black frames or artifacts may appear on screen, which severally disrupt the movie experience. To avoid discomfort to the user, in an embodiment of the invention, a duration of the switching from 2D to 3D and vice-versa is controlled in a seamless manner.

To allow the strength of the 3D effect to increase gradually without showing artefacts or black frames requires that the playback device and the processing stage in the display work together to achieve a "seamless" transition. In an advantageous further embodiment, the switching takes place only at predefined moments during playback. For example, such moments correspond to moment when the content itself is suitable to switch between 2D and 3D, for example at a scene cut, at the beginning of a new shot. Also the transition may occur in part of the content and story line for which it makes sense to switch to a more immersive experience for example action shots, or in a part of the content where the user can "explore" a scene in more detail. The seamless transition may be achieved by controlling the 3D depth during the transition continuously from zero to a desired value over a period of time, or vice-versa during 3D-2D transitions. Hence the strength of the 3D effect is increased gradually, allowing the users eyes and visual system to adjust and become comfortable with the 3D viewing experience.

In an embodiment of the method according to the invention, each stream comprises items, the associated playback information comprising playlists, each playlist indicating a sequence of items to be played back, at least one playlist comprising a main presentation path indicating a main sequence of video items of the primary video stream to be played back and an auxiliary presentation path indicating an auxiliary sequence to be played back, the auxiliary sequence comprising video items from the primary video stream and corresponding information items from the additional information stream. This embodiment carries the advantage the switch between 2D and 3D content can be obtained by switching between the main presentation path to the auxiliary presentation path, and it is suitable to be used when the playback format substantially corresponds to Blu-ray playback format.

In another embodiment of the method according to the invention, the playback format substantially corresponds to DVD-Video playback format, the playback information comprising Video Title Set Information (VTSI) comprising Video Attribute information, wherein the Video Attribute information comprising a video attribute indicating that the corresponding Video Title Set Information (VTSI) comprises the additional information stream for enabling three-dimensional (3D) display. This enables distribution of 3D video content in the DVD-Video playback format by providing information that 3D content is available, while maintaining playback compatibility with legacy DVD player.

Advantageously, the primary video stream and the additional information stream are MPEG elementary streams multiplexed together in a multiplexed video stream, the additional information stream being defined as an auxiliary stream. Auxiliary streams are ignored by a player unless specific command to decode the auxiliary stream is received; hence backwards playback compatibility is obtained.

Furthermore, a successful introduction of 3D video in the consumer market requires more than good displays, it also requires that 3D video provides a new compelling experience to the consumer. In the initial stage of the introduction, it is expected that content authors will experiment with the new medium whereby parts of a video stream will be 3D-video, whilst the main video will still be viewed mostly in 2D or in an enhanced 2D experience, whereby the content is in 2D but it is converted real-time in the display from 2D to "3D". Hence, it is not only desirable to easily switch between 2D and 3D content, but this switch from 2D to 3D during presentation should take place in a "seamless" manner. The user end will notice that the presentation has changed, however the transition should be un-obtrusive, not cause black frames or other artifacts in the video, which would interfere with the positive experience of the end-user.

This application also relates to a playback device for playback of video information comprising means for receiving video information and associated playback information being organized according to a playback format, the video information comprising a primary video stream for two-dimensional (2D) display and an additional information stream for enabling three-dimensional (3D) display, the associated playback information comprising display information indicating the types of video streams present; means for processing the display information to determine that both two-dimensional (2D) display possible and three-dimensional (3D) display are possible for the received video information; means for storing a playback setting of a playback device indicating whether the video information should be displayed two-dimensional (2D) or three dimensional (3D); and means for processing for display either the primary video stream or the primary video stream and the additional information stream, in accordance with the stored playback setting of the playback device.

This application also relates to a signal and a record carrier comprising recorded thereon said signal, the signal comprising video information and associated playback information the video information and associated playback information being organized according to a playback format, the video information comprising primary video information for two-dimensional (2D) display, and additional video information for enabling three-dimensional (3D) display, wherein the associated playback information comprises display information indicating the types of display possible.

These and other aspects of the invention are apparent from and will be explained with reference to the embodiments described hereinafter.

BRIEF DESCRIPTION OF THE DRAWINGS

The features and advantages of the invention will be further explained upon reference to the following drawings, in which.

DETAILED DESCRIPTION OF THE PREFERRED EMBODIMENTS

Figure 1:
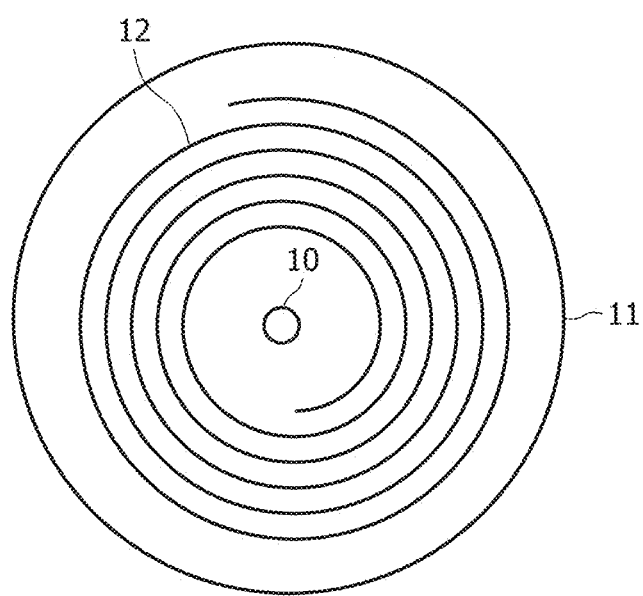
FIG. 1 illustrates schematically an optical disc.

FIG. 1 illustrates schematically an optical disc 11 having a track 12 and a central hole 10. The track 12, being the position of a series of pre-recorded marks representing information, and arranged in accordance with a single spiral pattern constituting substantially parallel tracks on an information layer. The optical disc may comprise one or more information layers of a recordable type. Known examples of pre-recorded optical discs are CD-ROM, or DVD-ROM or high density disc such as HD DVD-ROM or BD-ROM. For example, further details about the physical structure and addressing information for CD-ROM and DVD-ROM optical discs can be found in references ECMA-130 and ECMA-267 (ISO IEC 16449), respectively. In case of BD system, further details can be found in the publicly available technical white papers "*Blu-ray Disc Format General August* 2004" and "*Blu-ray Disc* 1.*C Physical Format Specifications for BD-ROM November*, 2005", published by the Blu-Ray Disc association (http://www.blurardisc.com). The information is represented on the information layer by optically detectable marks along the track. The track 12 on the optical disc is indicated by a pre-embossed track structure provided during manufacture of the blank optical disc. The track structure is constituted, for example, by a pregroove, which enables a read/write head to follow the track during scanning for reading and/or writing.

The optical disc 11 is intended for carrying user information according to a standardized format, to be playable on standardized playback devices. The recording format includes the way information is recorded, encoded and logically mapped onto the recording space provided by the track 12. The recordable space is usually subdivided into a lead-in area (LI) 31, a data zone (DZ) for recording the information and a lead-out area (LO) 32. The lead-in area (LI) 31 usually comprises basic disc management information and information how to physically access the data zone (DZ). For example, said basic disc management information corresponds to the table of contents in CD systems or the formatting disc control blocks (FDCB) in DVD systems.

The user information recorded in the data zone (DZ) is further arranged according to an application format, for example comprising a predefined structure of files and directories.

Further, at logical level, the user information recorded in the data zone is arranged according to a file system comprising file management information, such as ISO 9660 used in CD systems, available as ECMA-119, or UDF used in DVD systems, available as ECMA-167.

Figure 2:
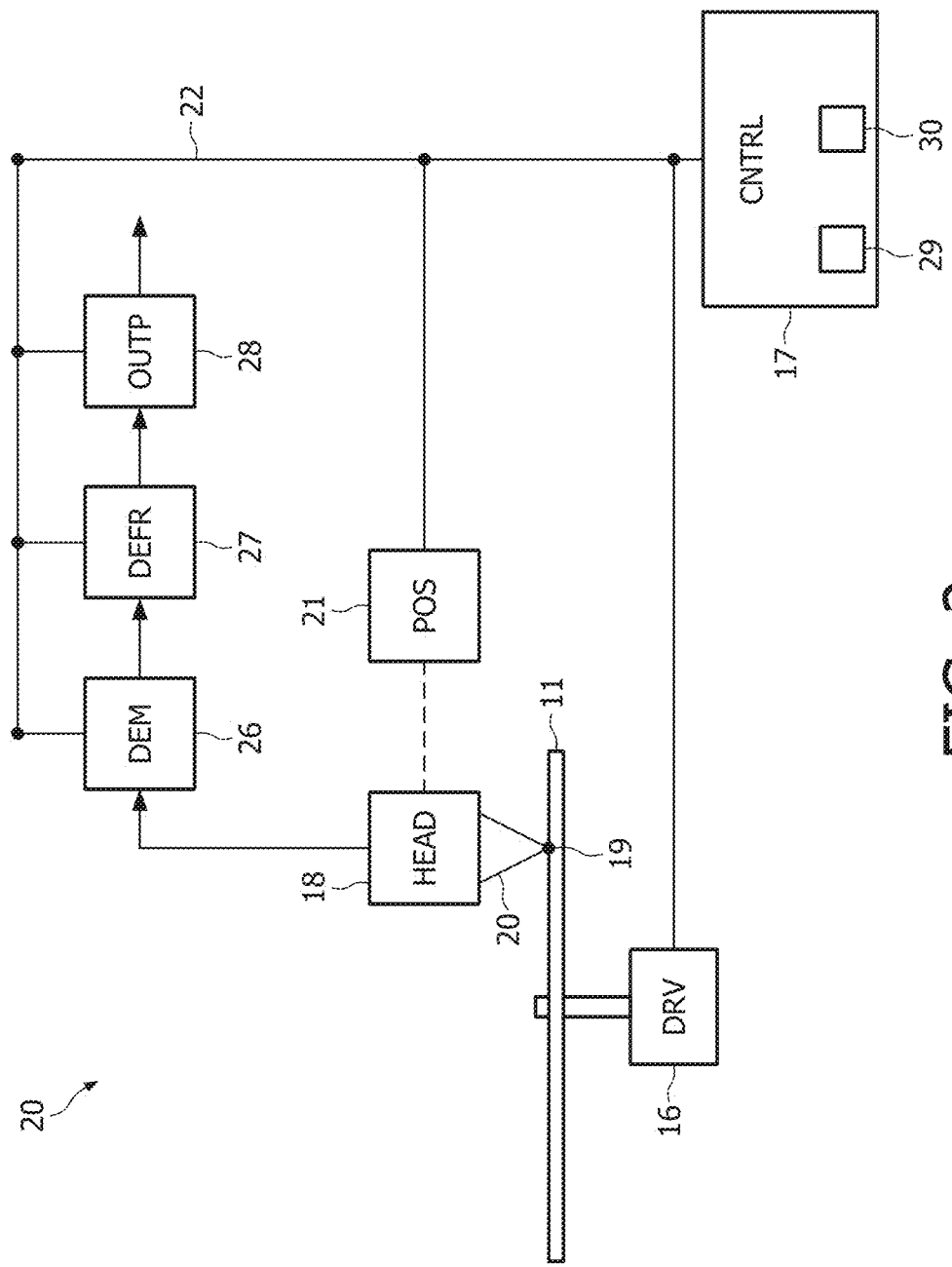
FIG. 2 illustrates schematically a playback device wherein the invention is practiced.

FIG. 2 illustrates schematically a recording device and/or a playback device wherein the invention is practiced.

The recording and/or playback device is provided with scanning means for scanning the track of the optical disc, the scanning means comprising a drive unit 16 for rotating the optical disc 11, a head 18, a positioning unit 21 for coarsely positioning the head 18 in the radial direction on the track, and a control unit 17. The head 18 comprises an optical system of a known type for generating a radiation beam 20 guided through optical elements for focusing said radiation beam 20 to a radiation spot 19 on the track 12 of the optical disc 11. The radiation beam 20 is generated by a radiation source, e.g. a laser diode. The head further comprises (not shown) a focusing actuator for moving the focus of the radiation beam 20 along the optical axis of said beam and a tracking actuator for fine positioning of the radiation spot 19 in a radial direction on the center of the track. The tracking actuator may comprise coils for radially moving an optical element or may alternatively be arranged for changing the angle of a reflecting element.

For reading information, the radiation reflected by the information layer is detected by a detector of a usual type, e.g. a four-quadrant diode, in the head 18 for generating a read signal and further detector signals, such as a tracking error and a focusing error signal for controlling said tracking and focusing actuators. The control unit 17 controls the retrieving of information from the optical disc 11, and may be arranged for receiving commands from a user or from a host computer. To this end, the control unit 17 may comprise control circuitry, for example a microprocessor, a program memory and control gates, for performing the procedures described hereinafter. The control unit 17 may also be implemented as a state machine in logic circuits.

For reading, the read signal is processed by a read processing unit comprising a demodulator 26, a de-formatter 27 and output unit 28 for processing the information and outputting said information to suitable means, such as display, speakers. The functioning of the demodulator 26, the de-formatter 27 and the output unit 28 are controlled by the controller 17. Hence, retrieving means for reading information include the drive unit 16, the head 18, the positioning unit 21 and the read processing unit. The demodulator 26 is responsible for demodulating a data signal from the channel signal, by using suitable channel decoder, e.g. as disclosed in U.S. Pat. No. 5,920,272 or U.S. Pat. No. 5,477,222. The de-formattter 27 is responsible for using error correction codes and/or de-interleaving for extracting the information signal from the data signal. The output unit 28, under the control of the control unit 17, is responsible for processing the information signal at logical level. Furthermore, it is noted that the information signal may be arranged according to a playback format, which may prescribe that management information is associated to the audio-video information. Hence the output unit is responsible for separating management information from the audio-video information, and for de-multiplexing and/or decoding the audio and/or video information. Suitable compression/de-compression means are described for audio in WO 98/16014-A1 (PHN 16452), and for video in the MPEG2 standard (ISO-IEC 13818). The recording format in which this the user information is to be recorded prescribes that management information for managing the recorded user information is also recorded onto the optical disc The video and audio information generated by the output unit 28 is sent to suitable rendering means, such as a suitable display for the video information. A number of auto-stereoscopic devices that are able to switch between 2D and 3D displays are known, one of them being described in U.S. Pat. No. 6,069,650. The display device comprises an LCD display comprising actively switchable Liquid Crystal lenticular lens. Depending on the image content a defined set of locations at the display can be switched to either 2D or 3D mode. For content providers that intend to make use of such display systems, such as movie studios, it is desirable to be able to distribute both 2D and 3D content on the same record medium in a format that is playback compatible with legacy players, that players not enabled to display 3D stream should be able to handle the record medium.

Figure 3:
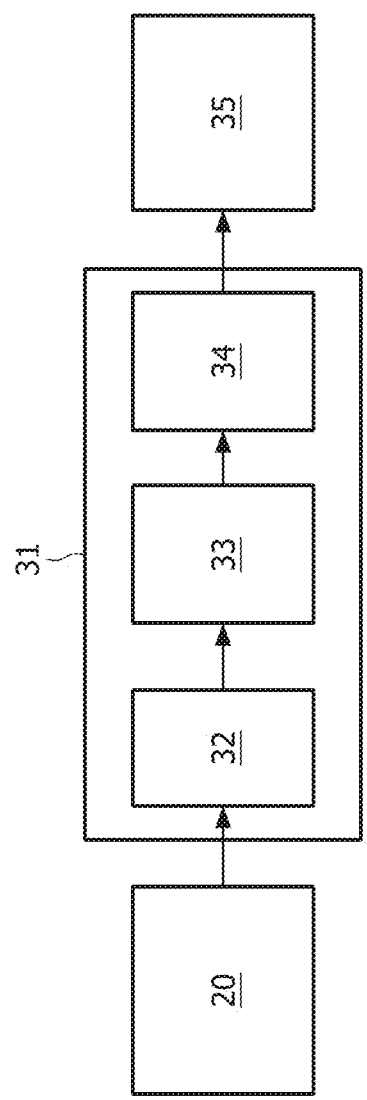
FIG. 3. illustrates schematically playback, rendering and display of 3D content on an autostereoscopic multiview display FIG. 4. illustrate the use of gain and offset parameters in an autostereoscopic display for generating a 2D-3D transition

FIG. 3 illustrates schematically playback, rendering and display of 3D content on an autostereoscopic multiview display. In auto-stereoscopic displays, processing inside a processing unit 31 converts the image+depth input format, outputted by the playback device 20 described with reference to FIG. 2, to multiple views and maps these onto the sub-pixels of the display panel 35. It is duly noted that the processing unit 31, also known as a rendering unit, may reside either inside the display 35 or in the playback device 20. This processing unit 31 deals with converting the output format of the playback device 20 to a format suitable for processing, then generating the required number of views in the processing unit 31 and then mapping these views onto the right pixels on the display. The processing unit 31 may suitable comprise a demultiplexer 32 for demultiplexing the outputted stream, a image processing and rendering stage 33 for generating the multiple views and an interweaving unit 34.

With respect to the coding of video information, the multiple views necessary for a 3D display can be computed based on a 2D picture and an additional picture, a so-called depth map, as described in Oliver Sheer—"3D Video Communication", Wiley, 2005, pages 29-34. The depth map conveys information about the depth of objects in the 2D image. The grey scale values in the depth map indicate the depth of the associated pixel in the 2D image. A stereo display can calculate the additional view required for stereo by using the depth value from the depth map and by calculating the required pixel transformation. A writing device compresses and transmits the 2D picture and depth map. With respect to a format for compressing and transmitting 3D video information, a solution is to make use of MPEG streams, wherein an MPEG 3D video stream would comprise a 2D video stream (as either a one program—or a elementary video transport stream) and, multiplexed with the 2D video stream, an auxiliary stream comprising additional information to enable 3D display (such as a depth map stream).

It is noted that although in the above 2D video+depth map was described as the preferred format for these devices, it is not the only format that can be supported. For example the 2D video+depth map may be extended by adding occlusion and transparency information, or stereo+depth may be used as input format. Alternatively the multiple views may be used as input signal and mapped directly onto the display (sub) pixels.

Furthermore, it may be expected that part of the content is intended for 3D display and part of the content is intended for 2D display. Depending either on the viewing conditions or on the number of users viewing the display simultaneously or on user preference, it may be desirable to be able to easily switch between 2D and 3D content.

Based on the above considerations, the inventors had the insight that a method is needed such that the end user, through use of the system, can indicate whether he wishes to play the movie in 2D or 3D mode. In order for such method to be implemented the following are required:

the player should be able to store a playback setting of a playback device indicating whether the video information should be displayed two-dimensional (2D) or three dimensional (3D);

a method or application interface is required that allows the determination of the playback setting of the playback device;

the player should be provided with means to process the video information according to the determined playback settings.

With respect to the playback setting, for example, a register may be defined to store the correct display mode. Additionally, the player may be provided with a method of accessing the register for reading and writing the correct value to indicate playback in 2D or 3D mode. With respect to the determination of the playback setting, an Application Programmer Interface (API) may allow an application on the disc to query the register to determine the default setting of the player (i.e. 3D or 2D). Additionally, it may be advantageous, that a further Application Programmer Interface and a related Callback method are defined such that an application may receive notification of when the value of this register changes.

Additionally, it is desirable that the playback device is enabled to determine which stream (or sub-stream) to select for playback in 3D mode. This method is similar to a language or audio stream selection, during playback the playback device can select playback of a separate stream that corresponds to a user action. When using a 3D MPEG video as described above (multiplexed 2D video as primary video stream and 3D information encoded as an auxiliary stream), it is necessary that the auxiliary stream that carries the additional 3D information is provided with a new identifier that indicates the type of the auxiliary stream (i.e. a 3D depth map data). The solution according to the inventors is to include identification of a 3D stream in the metadata definitions of the distribution format such that the playback device can select which title contains such an additional auxiliary stream containing 3D information without having to analyze the lower level MPEG system information. Additionally a playback device can use this information to prepare the system in the correct configuration of 3D playback.

Herein below, an embodiment of the invention will be detailed in the particular case that the playback format substantially corresponds to DVD-Video playback format.

It is known in the art that a playback device enabled to playback DVD-Video information is provided with several predefined Player Configuration settings, which are used to determine playback setting for audio (e.g. selection of audio decoder) and video. With respect to video, these include a Player Configuration for Video setting (P_CFG) which allows the user to indicate the display mode and the aspect ratio. According to this embodiment of the invention, the Player Configuration for Video setting is modified. The known Player Configuration for Video setting is a 4 byte register, from which only the first 4 bits (least significant bits) of the second byte are used for defining the video settings. According to the invention, the 4 most significant bits of the second byte are used to indicate the Display Mode (being either, 3D multiview, stereo or 2D etc.) A example of a possible definition of these bits:

0000=2D,
0001=stereo,
0010=3D multiview.

Furthermore, according to this embodiment of the invention, the known method Video_Presentation_Mode_Change (Mode) is adapted that it further allows to change the setting of the Video setting (P_CFG) to any of the values as indicated hereinabove.

According to an alternative embodiment of the invention, a new System Parameter (SPRM) may be added to indicate the player configuration for 3D. It is noted that there are two reserved values for system parameters in known DVD players that could be used for this purpose, corresponding to 2D and 3D display. Alternatively, new system parameters could be defined.

Furthermore, in DVD systems, the concept of navigation is used to describe the information required by the player to select which streams to decode and playback according to playback of a certain title. The information that describes attributes of the video streams in a title are described in the Video Title Set Information (VTSI). in The Video Title Set Information (VTSI) comprises a table called the Video Title Set Information Management Table (VTSI_MAT). This table lists a number of entries such as the number of audio streams and attributes of those audio streams. It also has entries for sub-pictures streams. It also comprises a single video attribute entry (VTS_V_ATR), as in DVD systems use only MPEG Program stream, only one video stream being allowed in a Program Stream. This video attribute entry (VTS_V_ATR) describes what compression is used, the aspect ratio, TV system etc. According to this embodiment of the invention, the video attribute entry (VTS_V_ATR) is extended to further comprise an additional field indicating that the title contains 3D information. This extension allows a playback device to determine which title comprises 3D information is to extend.

There are several options for implementing such extension. In more detail, the video attribute entry (VTS_V_ATR) consists of a two byte word, of which the second least significant bit is a reserved bit which is not used. This can be used to indicate the presence of 3D information whereby 0b would indicate no 3D, and 1b would indicate that 3D information is present. Other fields could be used to indicate this, such as the Display Mode field, which has a reserved entry that could be used for this purpose. The use of reserved fields allows a solution that is compatible with legacy playback devices that are not 3D aware. Furthermore, this provides compatibility with storing the 3D video information in a auxiliary stream, as legacy playback devices ignore this additional stream.

When content is distributed in the format described above, with 3D information encoded as an auxiliary stream, a playback device according to the invention is able to determine which title comprises 3D information and, within that title to use the auxiliary stream for providing 3D display.

Herein below, an embodiment of the invention will be detailed in the particular case that the playback format substantially corresponds to BD playback format.

BD playback devices use setting registers for storing playback preferences, such as user audio language preferences. According to an embodiment of the invention, these registers are extended to include a register for storing the 3D setting in the playback device such that an application on the disc can determine whether to play a title in 2D or in 3D. A preferred embodiment is to include a register and make use of the reserved values for the register number. For example Player Settings Register (PSR) numbered 20 through 28 are presently reserved and could be used for a new register indicating whether the playback device is set to 3D video playback mode or not. Another option is to use reserved bits in an existing register such as PSR 29 that holds the Player Capability for video. This register currently only uses 2 bits of the reserved four bytes.

It is noted that, in BD systems, Java application can be used for control of playback. Hence an BD-Java application provided on the recording medium can be executed by the playback device and access the value of the playback device settings registers either through the know getPSR( ) methods or through the known BD user setting and preference Application Interfaces (API's). A Movie mode application can use low level commands to copy the value from a settings register to a general purpose register on which it can perform operations such as bit masking to obtain the status of the players 3D mode.

With respect to navigation and presentation, in BD systems, the concept of playlists and playitems is used to carry information on presentation of the audio and video content.

Playitems are parts of the presentation of a movie, browsable slideshows etc. A playlist is a collection of playitems and typically spans the whole length of a presentation. A playlist has one main presentation and may have several sub-presentation paths. For example a video stream with an associated audio and text subtitle track.

The following sub-path are known in BD systems:
0 reserved
1 Main transport stream (TS) for a main-path of Movie
2 Main TS for a main-path of Time based slide show
3 Main TS for a main-path of Browsable slide show
4 Sub TS for a sub-path of Browsable slide show
5 Sub TS for a sub-path of Interactive Graphics menu
6 Sub TS for a sub-path of Text subtitle
7 Sub TS for a sub-path of one or more elementary streams path
8 255 reserved In an embodiment of the invention, an additional information stream that contains 3D information is added as a sub-path of the main 2D video stream in the playlist. This may be implemented by means of extending the Sub-path types to include a new type indicating that a sub-play item points to an elementary stream carrying a 3D video stream that should be presented together with the main 2D video stream and sent to the display. For example, this extension could be a sub-path type value of 8.

With respect to implementation of the invention in a playback device as described with reference to FIG. 2, the following are noted:

According to the invention, the playback device is provided with means (30) for storing a playback setting of a playback device indicating whether the video information should be displayed two-dimensional (2D) or three dimensional (3D). For example, such means may be provided as a non-volatile memory provided in the control unit 17 or the outputting unit 28.

Furthermore, the playback device according to the invention is provided with means (29) for receiving video information and associated playback information being organized according to a playback format, the video information comprising a primary video stream for two-dimensional (2D) display and an additional information stream for enabling three-dimensional (3D) display, the associated playback information comprising display information indicating the types of video streams present with means for processing the display information to determine that both two-dimensional (2D) display are possible and three-dimensional (3D) display are possible for the received video information and with means for processing for display of either the primary video stream or the primary video stream and the additional information stream, in accordance with the stored playback setting of the playback device. The means (29) referred hereinabove may correspond to an application (29) that runs as part of the movie presentation in the control unit 17 and that can query the playback setting and adjust the presentation accordingly. From the perspective of a user interface, the selection of 2D or 3D playback can be as easy as a dedicated 2D/3D button on the remote control.

Alternatively the playback device can be configured to directly select that part of the video information that contains 3D information by identifying those parts from the stream description in case no application is present. This can also be used when the user navigates the content directly (for example on a personal computer instead of a dedicated video player) in which case the player or system can indicate which parts of the content may be presented in 3D.

Furthermore, the outputting unit is further adapted for processing for display either the primary video stream or the primary video stream and the additional information stream, in accordance with the stored playback setting of the playback device.

In the initial stage of the introduction, it is expected that content authors will experiment with the new medium whereby parts of a video stream will be 3D-video, whilst the main video will still be viewed mostly in 2D or in an enhanced 2D experience, whereby the content is in 2D but it is converted real-time in the display from 2D to "3D". Hence, it is not only desirable to easily switch between 2D and 3D content, but this switch from 2D to 3D during presentation should take place in a "seamless" manner. The user end will notice that the presentation has changed, however the transition should be un-obtrusive, not cause black frames or other artifacts in the video, which would interfere with the positive experience of the end-user.

When transitioning from 2D to 3D or vice-versa, the playback device and the video processing stage must be re-configured to change from presentation mode. During this re-configuration process, black frames or artifacts may appear on screen, which severally disrupt the movie experience. To avoid this and viewer discomfort at least one of the following issues may be addressed in an improved embodiment of the invention:

The content itself preferably is suitable to switch between 2D and 3D. This means that the content author ensures that the points where the content can be switched between 2D and 3D do not occur in the middle of a shot or video scene, but instead can only take place at a scene cut, or at the beginning of a new shot. Also the transition should occur in part of the content and story line for which it makes sense to switch to ensure a more immersive experience for example action shots, or in a part of the content where the user can "explore" a scene in more detail.

The strength of the 3D effect should increase gradually, allowing the users eyes and visual system to adjust and become comfortable with the 3D viewing experience.

Preferably, the decoding of the video is not interrupted, hence no black frames or hiccups in the presentation.

Preferably, The display does not show artifacts when switching from 2D to 3D mode.

In order to allow the strength of the 3D effect to increase gradually without showing artefacts or black frames, a solution according to the invention is that the playback device and the processing stage in the 3D display work together to achieve a "seamless" transition. To achieve this, the inventors designed a system that provides an application interface (API) that can indicate exactly when the transition should occur together with the duration of the transition. Suitable known application interfaces to be used as a start point are the Blu-ray Disc application interfaces (HD-Movie mode or BD-Java). According to an embodiment of the invention, in response to a command to execute a transition from 2D to 3D or vice-versa, the application at the playback device embeds commands in a frame header (or on the interface directly) to make the display change the depth settings in the display and, if supported by the display, also commands to control the number of views. Additionally the playback device selects an appropriate section of content on the optical disc for playback during the transition period, followed by starting playback of 3D video content.

Hence further embodiments of the invention relates to at least one or to any combination of the following:

An application interface (API) enabled to allow an application on the optical disc to indicate when to transition between 2D and 3D mode and what a desired transition period is.

Commands embedded in a frame header or directly on the video interface (HDMI) to indicate to the 3D display to change the depth- and optional view settings. Alternatively commands embedded in a frame header or on the video interface, which indicate to the display to transition between 2D and 3D, and preferably the duration of the transition.

A format of video content on the optical disc which is authored such that the "depth" data is interleaved with black lines to create a frame size and resolution that matches the 2D image content and which provides a seamless experience from a content perspective between the 2D and 3D sections of the movie.

A method of combining the 2D image data with the "depth" data that avoids re-configuration of the hard- and software in the playback device.

As mentioned before one of the problems to overcome for obtaining a seamless transition is that the depth effect should change gradually. Herein we disclose two solutions according to the invention.

In a first solution, the playback device can alter the colors of the depth map such that the depth increases and decreases gradually, while in the second solution either the playback device or the 3D display are enabled to change settings in the rendering unit. The rendering unit generates multiple views for display on the multi-view display by shifting pixels from the 2D image to the left or right to create a new view. The amount of shift depends on the value of the corresponding pixel in the depth or disparity map (there is a approximated linear relation between disparity and depth) and on the offset and gain settings in this stage. By manipulating the gain values the amount of depth can be increased (in fact this increases the amount of pixel shift), the offset can be used to position the depth of more behind or—in front of the screen. To gradually change the depth for a smooth transition the player could change these gain and offset parameters in the rendering unit and in this way change the perceived depth without having to alter the content of the depth or disparity map stream.

Figure 4:
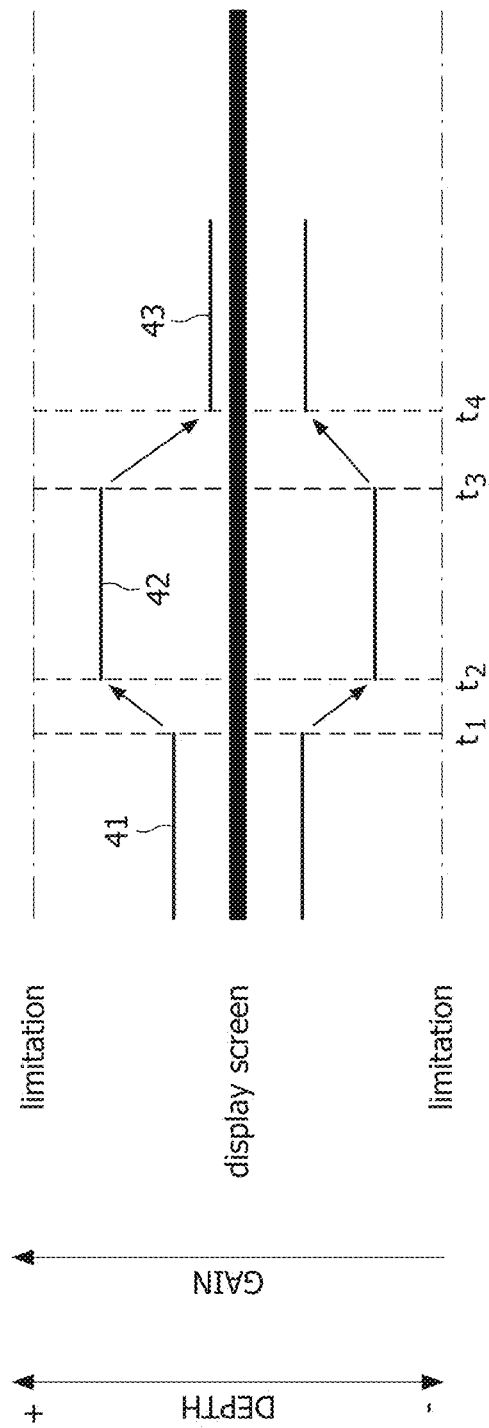

In a known autostereoscopic display these parameters can be set by the user through a control panel. FIG. 4 illustrates how these parameters can be changed over time such that a display changes the apparent position of a displayed object.

On vertical axis the relative gain and the depth are displayed, while on the horizontal axis time is displayed. At moment t1 a change from 2D to 3D is initiated, as a result of the user changing the display mode, or by the player automatically when a transition between 2D and 3D is detected, or by a Java application on disc through a special API. This last approach requires the definition of a new API for the playback apparatus, to be described later in this application, but it has the advantage that it gives content authors dynamic control of these settings.

The change of parameter takes place over a finite time interval, to a final desired value, when the display functions in 3D mode. Between time moments t3 and t4 a change from 3D to 2D is illustrated. As can be seen from FIG. 4 the gain value varies between 0 and 63, with 63 being the maximum amount of "depth". The offset may vary from 0 to 255, with 128 being on the screen and 0 behind and 255 in front In case of BD media and BD players, it is known that such systems make use of Java and, in particular, the org.bluray.media package. A suitable API, would be part of the org.bluray.media package and would inherit the methods from the javax.media.Control class as detailed below:

Class 3DvideoOffsetControl
void setOffset(int offset)
int getOffset( )
Class 3DvideoGainControl
void setGain(int gain)
int getGain( )

Furthermore, in an improved embodiment, suitable interfaces such that an application can register to an event to indicate any changes to these settings are provide.

It is known that typical autostereoscopic displays sacrifice some resolution when displaying in 3D mode. This is because showing multiple views requires additional pixels, the higher the number of views the more pixels that are required and thus the lower the resolution. According to an embodiment of the invention, one solution to increase the resolution in normal 2D mode is the use of a switchable display that can switch on and off the sheet of lenticular lenses in front of the display. This switching does take some time (seconds) but it is non-disturbing to the user. According to another embodiment of the invention, a system is added to enable the rendering unit to gradually increase or—decrease the number of views and thereby at the same time gradually changing the resolution. This system may coupled to the switching on and—off of the lenticular lenses.

It is known that current state-of-the art autostereoscopic displays have the rendering unit integrated and use commands embedded in a header to change rendering parameters. Alternatively, according to an embodiment of the invention, the playback apparatus is enabled to transmit corresponding rendering parameters to the rendering unit provided in the 3D display over the DVI\HDMI bus using the known i2c protocol.

Hence, according to the invention, the known rendering parameter set is extended to include additional parameters for setting the number of views. These additional parameter to the known ones, may be disparity and offset parameters that can be used by the player to ensure a "seamless" transition from 2D to 3D and vice versa.

In an alternative embodiment, the seamless transition is controlled by the rendering unit itself. In this case the additional parameter corresponds to a command from the playback device to the rendering unit in the display to gradually switch from 2D to 3D, possibly with an additional timing parameter to indicate the time within which the transition should occur, such that to align the transition with the content. Preferably these parameters are standardized such that a Java application on the disc written by a content author can control transition parameter on all playback apparatuses. The alternative embodiment may be more advantageous as the transition between switching between the lenses on or off can then be tightly controlled by the display.

The suitable application interface (API) in case of BD systems for supporting seamless transitions from 2D to 3D in switchable displays could be defined as follows:
Class DisplayMode
setTo3D(int dtime, long framenumber)
setTo2D(int dtime, long framenumber).
wherein dtime=duration of transition (in time units or number of frames)
framenumber=the frame at which the display should start the transition.

Next to defining the API as described above, the transition parameters need to be communicated to the display. The transition parameters preferably comprises a transition time parameter and a command indicating the mode switch should be embedded in a header of the frame indicated by the frame number of the API method. Alternatively, instead of a header, the transition parameters may be sent using i2c commands as known from the Enhanced Display Data Channel Standard, Version 1 (1999) VESA, which is available at www.vesa.org. Other commands as known from the 2D video format specification for HDMI or the DisplayPort Standard v1.1 Mar. 2007 VESA, which is available at www.vesa.org, may also be used.

The duration transition parameter is advantageous in order to allow alignment the transition between modes with the video content on disc. In order to provide a seamless natural experience, preferably the video content is authored such that that the boundaries of a transition are between scenes and not in the middle of a scene. Additionally, in order to provide an optimal experience, the disc may contain a section of content authored such that the transition occurs naturally without interrupting the movie experience. This implies that the disparity (the depth effect) increases gradually and movement in the scenes is minimal during the transition segment. Preferably, other depth cues (such as linear perspective, occlusion, lighting) are only sparsely used before and during the transition and they match the depth impression from the disparity created by the 3D part of the content.

In addition to providing a gradual transition, it is also desirable that no artifacts or black frames occur, as this may interrupt the movie experience. To achieve this several steps can be taken.

First of all, when the playback is switched between 2D and 3D, it is preferable that the buffers for decoding of all the streams do not under- or overflow. The decoding must be continuous. In Blu-ray Disc systems the conditions a 2D stream must meet with regard to video parameters and allocation on the disc were defined. For example, for a seamless connection between segments of video, the resolution and frame rate etc should be the same between the segments. Also the segments should be allocated on the disc such that during reading, the decoding buffers do not go empty (causing black frames). For "depth" based or stereo formats as previously described, the same rules may apply as to the 2D case. These formats mean that in a writing device, additional streams are multiplexed in the transport stream, and in a reading device the additional streams are decoded and presented simultaneously. 3D streams using the auxiliary stream carriage method were defined in MPEG ISO/IEC JTC1/SC29/WG11; WD 1.0 of ISO/IEC 23002-3 Auxiliary Video Data. Hence such an additional stream, in case of BD systems, will automatically meet the same requirements with regards to bitrate and allocation on disc as those known for 2D streams.

Some additional considerations must be taken into account. In an embodiment of the invention, additional 3D information was carried as a secondary video stream in BD, and this additional 3D information could be presented in a Picture-in-Picture (PIP) stream. Experiments performed by the inventors have shown that this solution according to the invention works, activating the PIP feature may induce some delay. Inventors found that the origin of the delay is related to the reconfiguration of the system such that the secondary and/or the primary video are scaled. During this re-configuration process the system may show artifacts such as black frames or garbled images. To overcome this problem, the inventor came up with an improved embodiment of the invention, which uses interleaving of the primary video with the secondary video and which further uses luma keying. FIG. 3 shows an example of how this embodiment of the invention works. It is noted that in FIG. 3 the lines of the depth map data are larger and they have been exaggerated compared to reality, such that the effect are visible in the image.

Figure 5A:
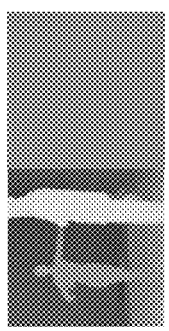
FIGS. 5A, 5B, 5C and 5D illustrate the use of luma keying for overlaying "depth" data over 2D image in an interleaved manner.
Figure 5B:
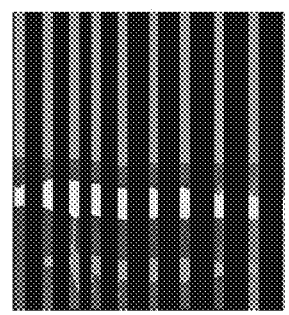
Figure 5C:
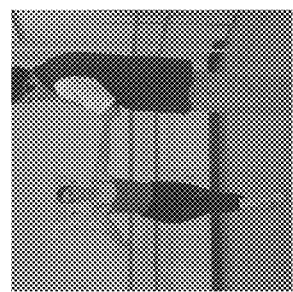
Figure 5D:
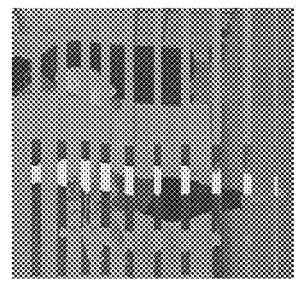

FIG. 5A is a depth map image with some additional information (the gray area) to carry background or occlusion data is shown. In reality the amount of additional information can be much smaller. The resolution of the "depth" data may be less than a quarter of the 2D resolution, or even lower in an improved embodiment wherein technologies like CADE, as disclosed in WO200213141 to be incorporated herein by reference, are used. In FIG. 5B the "depth" data is interleaved with black lines in such a way that the total size of the "depth" map data is the same as that of the 2D video. This may be done in a playback device but more likely it could be provided in this format on the disc. In this form the "depth" data, interleaved with black lines, is overlaid on top of the 2D video. Then, luma keying is performed to make the black lines transparent, hence revealing most parts of the 2D video in the background. This is depicted in FIG. 5D.

As is shown in FIGS. 5A, 5B, 5C and 5D, some parts of the 2D video will be covered by the "depth" data. However as the resolution of the depth data may be small, this loss in vertical resolution will be quite small. Also the interleaving with black lines may be done in such a way that mostly the lines at the top and the bottom of the 2D video background are covered. When used for an autostereoscopic display, this is even less of an issue as the display in 3D mode cannot show with the full HD resolution, as generating the required additional views comes at the cost of display resolution.

According to this embodiment of the invention, the associated Blu-ray Disc playlist is configured such that the secondary video stream is treated as a picture-in-picture stream, and that luma keying is to be applied and, preferably, the upper_limit_luma_key value is set to zero.

Alternatively, an additional entry is added to the extension data as used in BD system, the additional entry defined for 3D video streams allowing PIP metadata or 3D metadata. The syntax of both the 3D PIP metadata and 3D metadata can be the same exact for some naming conventions. For both 3D and PIP all the entries are required.

Finally it is noted that exemplary embodiments of the invention hereinabove were described with reference to a playback device for playback of information from an optical disc. It is noted that the source of the information is irrelevant, it may be provided locally on a recorded media such as optical media, hard disc or solid state memory, or it can be received with broadcasting via wired or wireless transmission systems, including the internet. The invention may be implemented in any device for playback of video information, including, among others, hard-disc recorders, set top boxes (STB) and digital (satellite/terrestrial/cable) receivers.

This invention can be summarized as follows: The invention relates to a signal comprising video information and associated playback information, the video information and associated playback information being organized according to a playback format, the video information comprising a primary video stream for two-dimensional (2D) display, and an additional information stream for enabling three-dimensional (3D) display, wherein that the associated playback information comprises display information indicating the types of display possible. The invention also relates to a method and device for playback of such a signal, the method comprising receiving the video information and the associated playback information, processing the display information to determine that both two-dimensional (2D) display possible and three-dimensional (3D) display are possible for the received video information; determining a playback setting of a playback device indicating whether the video information should be displayed two-dimensional (2D) or three dimensional (3D); and processing for display either the primary video stream or the primary video stream and the additional information stream, in accordance with the playback setting of the playback device.

It should be noted that the above-mentioned embodiments are meant to illustrate rather than limit the invention. And that those skilled in the art will be able to design many alternative embodiments without departing from the scope of the appended claims. In the claims, any reference signs placed between parentheses shall not be construed as limiting the claim. Use of the verbs "comprise" and "include" and their conjugations do not exclude the presence of elements or steps other than those stated in a claim. The article "a" or "an" preceding an element does not exclude the presence of a plurality of such elements. The invention may be implemented by means of hardware comprising several distinct elements and by means of a suitable programmed computer. A computer program may be stored/distributed on a suitable medium, such as optical storage or supplied together with hardware parts, but may also be distributed in other forms, such as being distributed via the Internet or wired or wireless telecommunication systems. In a system/device/apparatus claim enumerating several means, several of these means may be embodied by one and the same item of hardware or software. The mere fact that certain measures are recited in mutually different dependent claims does not indicate that a combination of these measures cannot be used to advantage.

The invention claimed is:

1. A method of operating a playback device for processing information for producing a presentation to be rendered on a video display, the processing suitable for either or both of information for two-dimensional (2D) display and information for three-dimensional (3D) display, the method comprising the acts of:

in a playback device:

controlling by a controller the playback device to perform the method;

receiving via an input controlled by the controller, information comprising: video information, and associated playback information, the video information and associated playback information being organized according to a playback format; and the controller processing the received information comprising: the received video information and the received associated playback information, according to the playback format;

the received video information comprising: a received primary video stream for two-dimensional (2D) display, and an additional information stream for enabling three-dimensional (3D) display, the primary video stream being an elementary video transport stream, the additional information stream being an auxiliary stream, the primary video stream and the additional information stream being multiplexed together, the primary video stream comprising video items, the additional information stream comprising information items; and the received associated playback information comprising display information indicating the types of video streams present, the associated playback information comprising playlists, each playlist indicating a sequence of items to be played back, at least one playlist comprising: a main presentation path indicating a main sequence of video items of the primary video stream to be played back, and at least one auxiliary playlist comprising an auxiliary presentation path indicating an auxiliary sequence of items to be played back, the auxiliary sequence comprising: video items from the primary video stream, and corresponding information items from the auxiliary stream, and a sub-play item points to a corresponding information item from the auxiliary stream that should be presented together with the video item and sent to the display; the processing comprising:

processing the display information to determine both: whether two-dimensional (2D) display is possible, and whether three-dimensional (3D) display is possible, for the received video information;

determining a playback setting indicating whether the video information should be displayed two-dimensional (2D) or three dimensional (3D), depending on the determination of whether two-dimensional (2D) display is possible, and whether three-dimensional (3D) display is possible, and storing the playback setting in a memory;

processing to display either: the primary video stream, or both the primary video stream and the additional information stream, in accordance with the determined playback setting of the playback device; and outputting through an output to a video display, the processed video information, and associated playback information, as a presentation to be rendered in two-dimensional (2D) or three dimensional (3D), by the video display, according to the determined playback setting stored in the memory.

2. The method of claim 1, comprising:

receiving a request to switch the playback setting either: from two-dimensional (2D) display to three-dimensional (3D) display, or from three-dimensional (3D) display to two-dimensional (3D) display; and switching in response to the request, in a seamless manner, either: from two-dimensional (2D) display to three-dimensional (3D) display, when it is determined that three dimensional (3D) display is possible, or from three-dimensional (3D) display to two-dimensional (3D) display, when it is determined that two dimensional (2D) display is possible.

3. The method of claim 1, wherein the additional information stream comprises a sub-path for indicating the sub-play item that points to the corresponding information item from the auxiliary stream that should be presented together with the video item.

4. A playback device for processing information for producing a presentation to be rendered on a video display, the processing suitable for either or both of information for two-dimensional (2D) display, and information for three-dimensional (3D) display, the device comprising:

a controller configured for controlling the playback device;

an input controlled by the controller and configured for receiving information through the input to the controller, the information comprising: video information, and associated playback information, the video information and associated playback information being organized according to a playback format; and the controller configured for processing the received information comprising: the received video information, and received associated playback information, according to the playback format;

the received video information comprising: a primary video stream for two-dimensional (2D) display, and an additional information stream for enabling three-dimensional (3D) display, the primary video stream being an elementary video transport stream, the additional information stream being an auxiliary stream, the primary video stream and the additional information stream being multiplexed together, the primary video stream comprising video items and the additional information stream comprising information items; and the received associated playback information comprising display information indicating the types of video streams present, the associated playback information comprising playlists, each playlist indicating a sequence of items to be played back, at least one playlist comprising: a main presentation path indicating a main sequence of video items of the primary video stream to be played back, and at least one auxiliary playlist comprising an auxiliary presentation path indicating an auxiliary sequence of items to be played back, the auxiliary sequence comprising video items from the primary video stream and corresponding information items from the auxiliary stream, a sub-play item points to a corresponding information item from the auxiliary stream that should be presented together with the video item and sent to the display;

the controller configured for processing the display information to determine both: whether two-dimensional (2D) display is possible, and whether three-dimensional (3D) display is possible, for the received video information;

the controller configured for determining a playback setting indicating whether the video information should be displayed two-dimensional (2D) or three dimensional (3D), depending on the determinations of whether two-dimensional (2D) display is possible, and whether three-dimensional (3D) display is possible;

the controller configured for processing to display either: the primary video stream, or both the primary video stream and the additional information stream, according to the determined playback setting of the playback device; and an output configured for outputting to a video display: the processed video information, and associated playback information, as a presentation to be rendered in two-dimensional (2D) or three dimensional (3D), by the video display, according to the determined playback setting of the playback device.

5. The device of claim 4, wherein the playback format corresponds to Blu-ray playback format.

6. The device of claim 4, comprising an input for user input, and the playback setting of the playback device being controllable based on the user input.

7. The device of claim 4, comprising a register configured for storing and retrieving the playback setting of the playback device, and the controller stores the playback setting in the register when the controller determines the playback setting.

8. A tangible computer-readable storage-medium that is not a transitory propagating signal or wave, the medium modified by control information including instructions for performing a method of operating a playback device for processing information for rendering a video on a display, the processing suitable for either or both of information for two-dimensional (2D) display and information for three-dimensional (3D) display, the method comprising the acts of:

in a playback device:

receiving via an input to a controller, information comprising: video information, and associated playback information, the video information and associated playback information being organized according to a playback format; and a controller processing the received information comprising: the received video information and the received associated playback information, according to the playback format;

the received video information comprising: a primary video stream for two-dimensional (2D) display, and an additional information stream for enabling three-dimensional (3D) display, the primary video stream being an elementary video transport stream, the additional information stream being an auxiliary stream, the primary video stream and the additional information stream being multiplexed together, the primary video stream comprising video items, the additional information stream comprising information items; and the received associated playback information comprising display information indicating the types of video streams present, the associated playback information comprising playlists, each playlist indicating a sequence of items to be played back, at least one playlist comprising: a main presentation path indicating a main sequence of video items of the primary video stream to be played back, and at least one auxiliary playlist comprising an auxiliary presentation path indicating an auxiliary sequence of items to be played back, the auxiliary sequence comprising: video items from the primary video stream, and corresponding information items from the auxiliary stream, and a sub-play item points to a corresponding information item from the auxiliary stream that should be presented together with the video item and sent to the display; the processing comprising:

processing the display information to determine both: whether two-dimensional (2D) display is possible, and whether three-dimensional (3D) display is possible, for the received video information;

determining a playback setting indicating whether the video information should be displayed two-dimensional (2D) or three dimensional (3D), depending on the determination of whether two-dimensional (2D) display is possible, and whether three-dimensional (3D) display is possible, and storing the playback setting in a memory;

processing to display either: the primary video stream, or both the primary video stream and the additional information stream, in accordance with the determined playback setting of the playback device; and outputting from the controller through an output to a video display, the processed video information, and associated playback information, as a presentation to be rendered in two-dimensional (2D) or three dimensional (3D), by the video display, according to the determined playback setting stored in the memory.

9. A tangible computer-readable storage-medium that is not a transitory propagating signal or wave, the medium modified by information including control information for controlling a method of operating a playback device for processing the information for producing a presentation to be rendered on a video display, the processing suitable for either or both of information for two-dimensional (2D) display and information for three-dimensional (3D) display, the information comprising:

a primary video stream for two-dimensional (2D) display, and an additional information stream for enabling three-dimensional (3D) display, the primary video stream being an elementary video transport stream, the additional information stream being an auxiliary stream, the primary video stream and the additional information stream being multiplexed together, the primary video stream comprising video items, the additional information stream comprising information items; and an associated playback information comprising display information indicating the types of video streams present, the associated playback information comprising playlists, each playlist indicating a sequence of items to be played back, at least one playlist comprising: a main presentation path indicating a main sequence of video items of the primary video stream to be played back, and at least one auxiliary playlist comprising an auxiliary presentation path indicating an auxiliary sequence of items to be played back, the auxiliary sequence comprising: video items from the primary video stream, and corresponding information items from the auxiliary stream, and a sub-play item points to a corresponding information item from the auxiliary stream that should be presented together with the video item and sent to the display; both the primary video stream and the associated playback information comprise the control information for controlling the method comprising the acts of:

in a playback device:
receiving via an input to a controller, the information comprising: video information, and associated playback information, the video information and associated playback information being organized according to a playback format; and a controller processing the received information comprising: the received video information and the received associated playback information, the processing comprising:

processing the display information to determine both: whether two-dimensional (2D) display is possible, and whether three-dimensional (3D) display is possible, for the received video information;

determining a playback setting indicating whether the video information should be displayed two-dimensional (2D) or three dimensional (3D), depending on the determination of whether two-dimensional (2D) display is possible, and whether three-dimensional (3D) display is possible, and storing the playback setting in a memory;

processing to display either: the primary video stream, or both the primary video stream and the additional information stream, in accordance with the determined playback setting of the playback device; and outputting from the controller through an output to a video display, the processed video information, and associated playback information, as a presentation to be rendered in two-dimensional (2D) or three dimensional (3D), by the video display, according to the determined playback setting stored in the memory.

10. The storage medium of claim comprising a Blu-ray optical storage disk.

* * * * *